(12) United States Patent
Fry

(10) Patent No.: US 7,111,645 B1
(45) Date of Patent: Sep. 26, 2006

(54) METHOD AND APPARATUS FOR SEALING HIGH PRESSURE TUBES

(76) Inventor: Michael E. Fry, 5589 Kiplington Dr., Cincinnati, OH (US) 45239

( * ) Notice: Subject to any disclaimer, the term of this patent is extended or adjusted under 35 U.S.C. 154(b) by 0 days.

(21) Appl. No.: 11/224,895

(22) Filed: Sep. 12, 2005

(51) Int. Cl.
*F16L 55/10* (2006.01)

(52) U.S. Cl. ............... 138/89; 138/90; 29/890.031

(58) Field of Classification Search ............ 138/90, 138/89, 91; 29/890.031, 402.09
See application file for complete search history.

(56) References Cited

U.S. PATENT DOCUMENTS

| | | | | |
|---|---|---|---|---|
| 798,031 | A * | 8/1905 | Gherky | 138/91 |
| 1,966,819 | A * | 7/1934 | Irvin | 137/1 |
| 2,107,259 | A * | 2/1938 | Hazel | 138/89 |
| 2,256,775 | A * | 9/1941 | Hubbell | 138/89 |
| 4,462,430 | A * | 7/1984 | Anthony et al. | 138/89 |
| 4,976,307 | A | 12/1990 | Hall et al. | 138/89 |
| 5,189,789 | A * | 3/1993 | Hall | 29/890.031 |
| 5,228,476 | A * | 7/1993 | Ashcroft | 138/89 |
| 5,558,130 | A * | 9/1996 | McCabe et al. | 138/89 |
| 6,244,301 | B1 * | 6/2001 | Scott et al. | 138/89 |
| 6,421,916 | B1 * | 7/2002 | Klahn et al. | 29/890.031 |

* cited by examiner

*Primary Examiner*—Patrick Brinson
(74) *Attorney, Agent, or Firm*—Larson & Larson, PA; Frank W. Liebenow

(57) ABSTRACT

A plug for sealing high pressure tubes is made from a memory-shape alloy. The plug is formed having a diameter greater than the inner diameter of the tube and is shaped by cooling to its martensite finish temperature and bending its wings in opposing directions such that at a later time, it will fit within the tube. After insertion into the tube, the plug is heated to its austenite finish temperature, restoring its wings to almost their original shape, thereby exerting force onto the tube walls, sealing the tube from leakage.

15 Claims, 10 Drawing Sheets

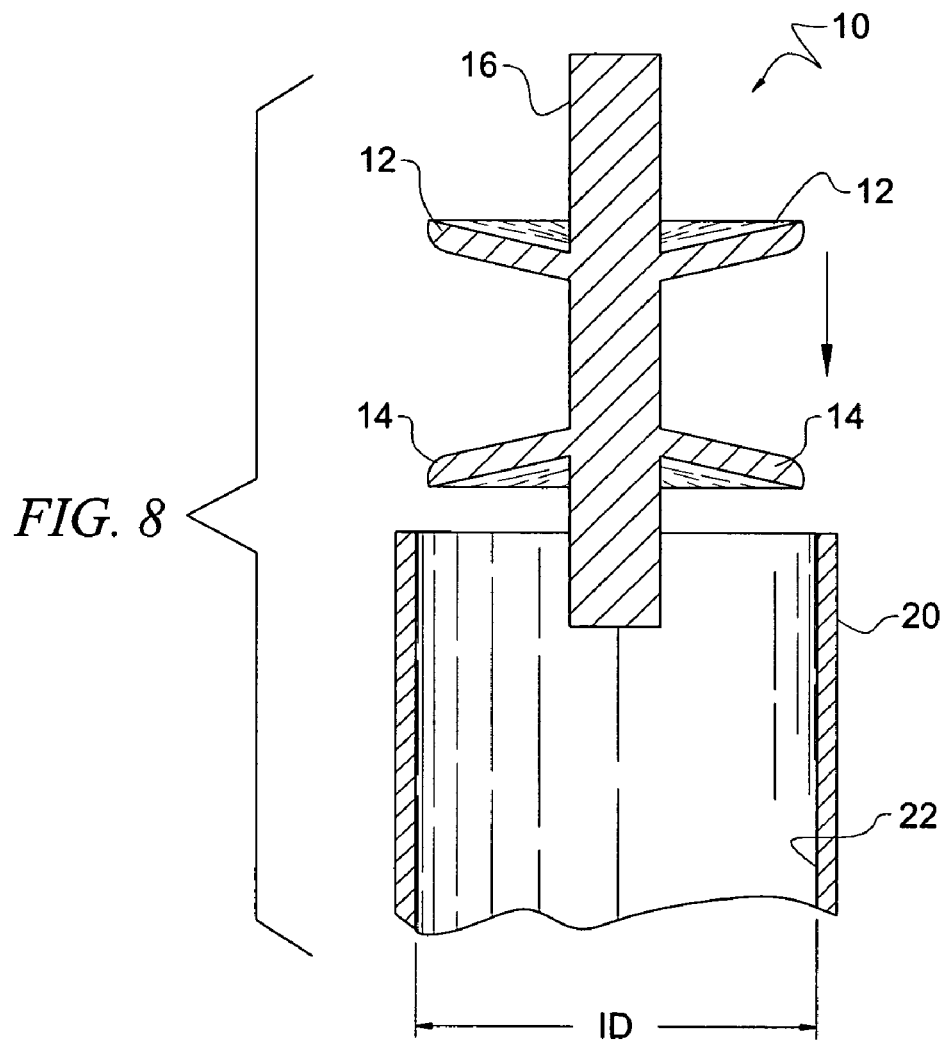
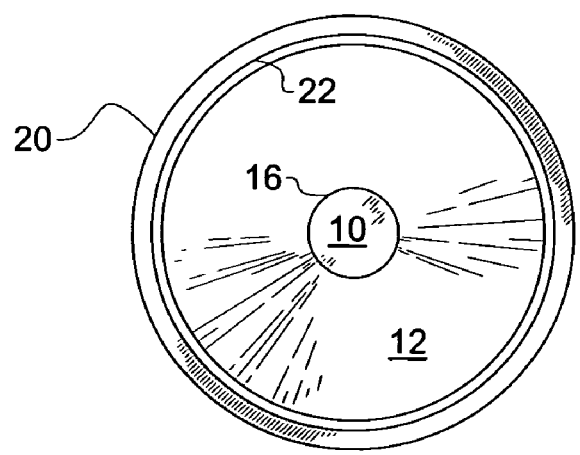
FIG. 9

FIG. 12
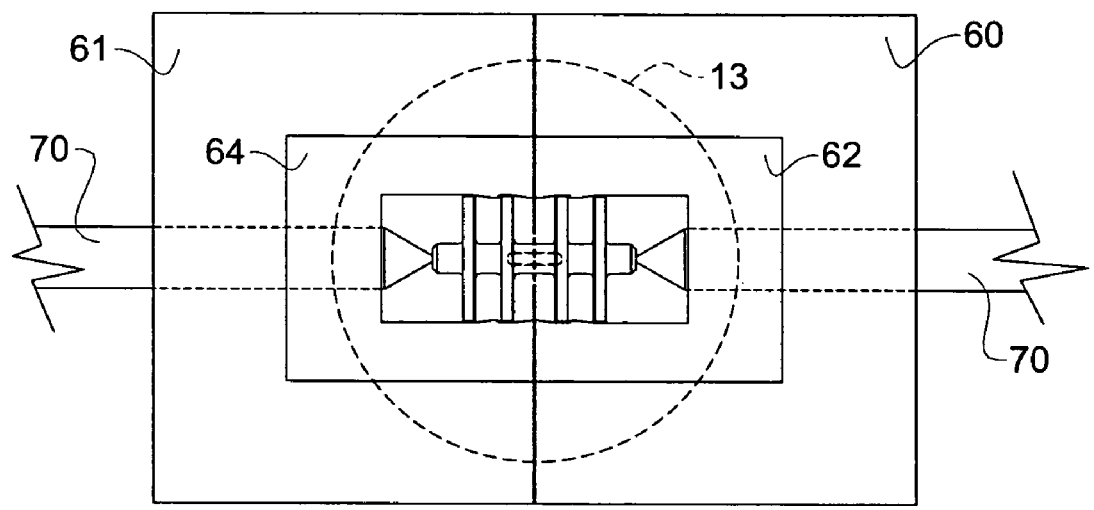
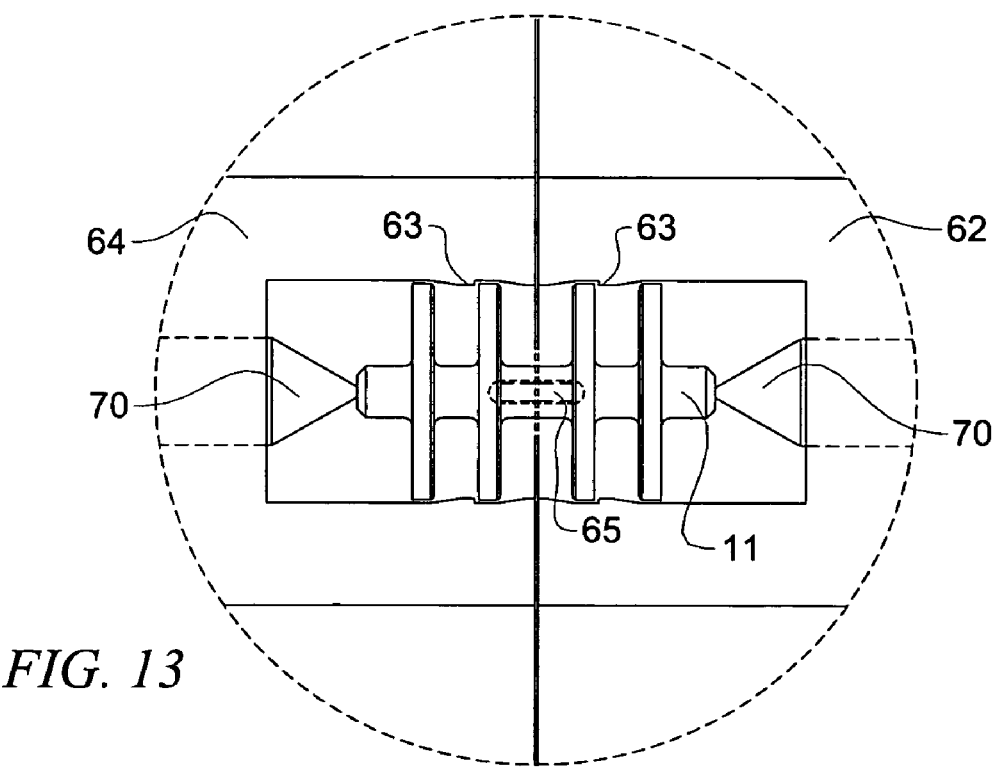
FIG. 13

METHOD AND APPARATUS FOR SEALING HIGH PRESSURE TUBES

BACKGROUND OF THE INVENTION

1. Field of the Invention

The present invention relates generally to a method and apparatus for sealing tubes and more particularly to sealing high-pressure tubes such as used in heat exchangers.

2. Description of the Related Art

In high pressure applications, especially where high pressure steam is present, conventional methods of sealing high pressure tubes are not always practical. Welding is one method, but tight working spaces often make it difficult to weld an individual high-pressure tube.

Various plugs have been used successfully, each with their limitations. The particular problems encountered in the industry are very well articulated in prior U.S. Pat. No. 4,976,307 and U.S. Pat. No. 5,189,789, both of which are hereby incorporated by reference in their entirety. The present invention is an improvement over the embodiments disclosed in these prior patents. A method of repairing a leaking feed water heater is to seal both the inlet and outlet ends of the leaky U-shaped tube at the tube sheet. This is much faster and substantially more economical than replacing the entire tube or the tube bundle. It has been shown that a feed water heater may be operated economically even when up to 10% of the tubes within the feed water heater have been plugged. If more than 10% of the tubes are plugged, the efficiency of the system declines to a level at which it is more economical to replace or repair the U-shaped tube bundles. Even when more than 10% have been plugged, the removal of the feed water heater from service and subsequent repair or replacement may be planned in advance and executed in an economical, orderly, non-crisis manner.

The plug described in U.S. Pat. No. 5,189,789 has several limitations. This plug must be cooled at the job site to a temperature below −20° to 30° C. using a mixture of alcohol and dry ice. The plug must then be shaped or formed using a jig or tool, also at the job site. It is then inserted into the tube and allowed to return to room temperature, at which time it restores to its original shape, sealing the tube. Creating the temperature required to form the plug at the job site not only uses volatile chemicals that can be dangerous to handle, precise forming of the plug is very difficult and any deviation from the required shape may result in a weak plug that will fail under pressure.

What is needed is a plug that can be completely manufactured and formed in a factory then packed, shipped and ready to install right off the shelf a method of manufacturing the plug and a method of installing the plug at the job site using readily available tools.

SUMMARY OF THE INVENTION

In one embodiment, a device for sealing a tube is disclosed including a plug having at least two annular plug wings made of a shape-memory alloy, the at least two annular plug wings formed substantially perpendicular to an axis of the plug and having an unbent diameter greater than an inner diameter of the tube. The at least two annular plug wings are bent in opposite directions when in a martensite phase and have a bent diameter less than the inner diameter of the tube.

In another embodiment, a method of method for sealing a tube is disclosed including selecting a plug having at least two annular plug wings and made of a shape-memory alloy; the at least two annular plug wings are formed substantially perpendicular to an axis of the plug and have an unbent diameter greater than the inner diameter of the tube and are bent in opposite directions when in a martensite phase, having a bent diameter less than the inner diameter of the tube. Then inserting the plug into an open end of the tube and heating the plug to a temperature corresponding to the plug's austenite finish temperature.

In another embodiment, an plug made of a shape-memory alloy is disclosed including at least two annular plug wings formed substantially perpendicular to an axis of the plug. The annular plug wings have an unbent diameter greater than the inner diameter of the tube and are bent in opposite directions when in a martensite phase so as to have a bent diameter less than the inner diameter of the tube.

BRIEF DESCRIPTION OF THE DRAWINGS

The invention can be best understood by those having ordinary skill in the art by reference to the following detailed description when considered in conjunction with the accompanying drawings in which:

FIG. 8 illustrates a side sectional view of a plug of a second embodiment of the present invention in its deformed state ready for insertion into a tube.

FIG. 9 illustrates a bottom view of a plug of a second embodiment of the present invention in its deformed state ready for insertion into a tube.

FIG. 11 illustrates a tool and die for making the plugs of the present invention.

FIG. 12 illustrates a tool and die for manufacturing the present invention.

FIG. 13 illustrates a close-up view of the die for manufacturing the present invention.

DETAILED DESCRIPTION OF THE INVENTION

Figure 1:
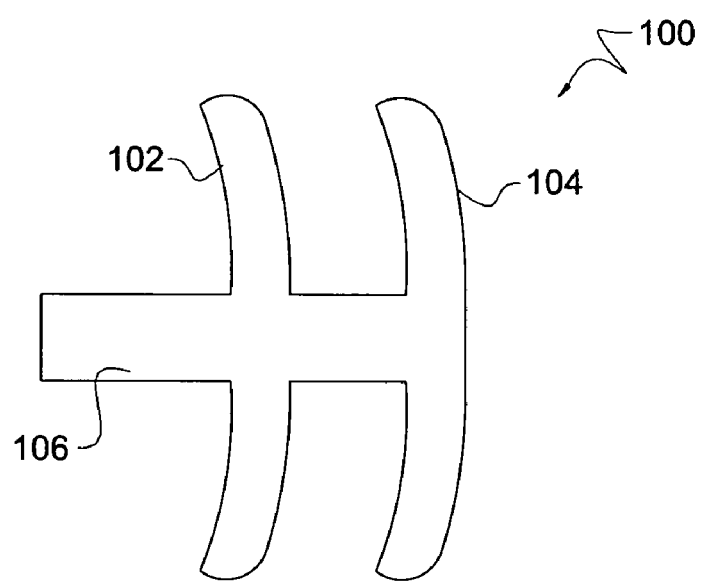
FIG. 1 illustrates a side view of a plug of the prior art after it has been cooled and molded into its insertion diameter.
Figure 2:
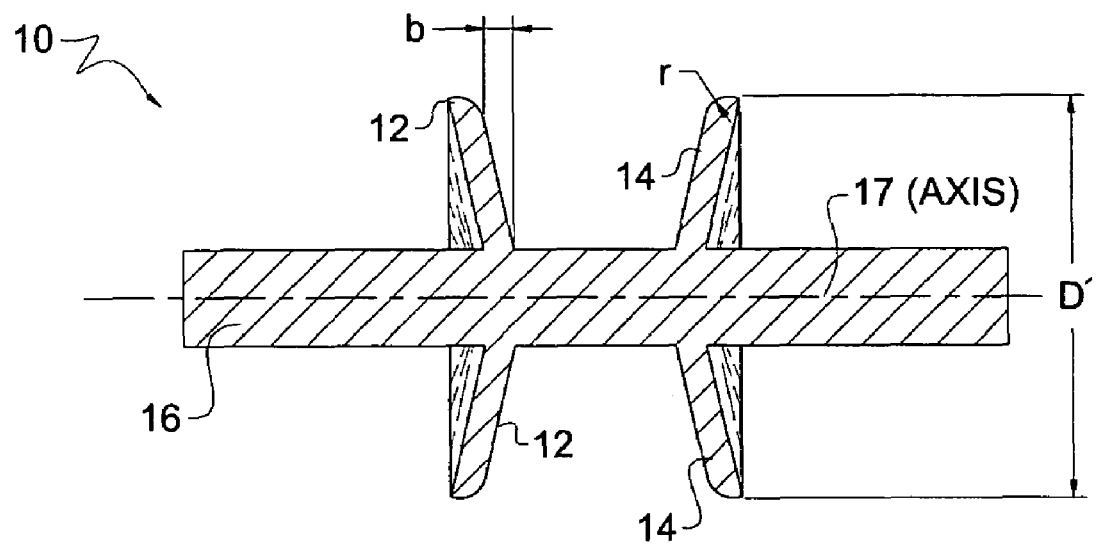
FIG. 2 illustrates a side sectional view of a plug of the first embodiment of the present invention in its deformed state.
Figure 3:
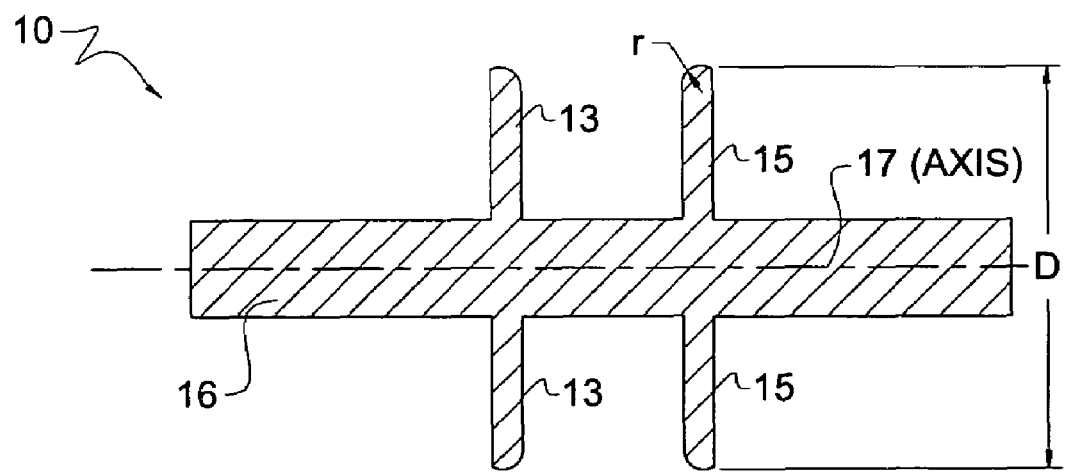
FIG. 3 illustrates a side sectional view of a plug of the first embodiment of the present invention in its restored state.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a plug of the prior art after it has been cooled and molded into its insertion diameter is shown. This plug 100 has two or more wings 102/104 on a shaft 106. Both wings 102/104 are bent in a mold and in the same direction with respect to the shaft 106 by cooling the plug 100 to its martensite finish temperature of approximately −60° to −80° C. using a mixture of dry ice and glycol or the like. The plug 100 is then inserted into a failed tube and allowed to return to ambient temperature, which is above its austenite finish temperature (described later), restoring to its original shape and diameter that is slightly larger than the inner diameter of the tube. Although this plug 100 has proven to seal tubes, there are several undesirable attributes that are remedied by the present invention. First, the use of dry ice and glycol presents a danger of frost burn and toxic chemical exposure at the installation site. Second, the bending of the wings 102/104 at the installation site provides limited accuracy and may result in one wing being bent more than another, causing eventual blow outs under pressure. Third, the force created by the wings being bent in the same direction pulls the plug in one direction when the plug restores. This moves the plug slightly but does not provide as high of a pressure seal as that of the present invention.

Referring to FIG. 2, FIG. 3, FIG. 10 and FIG. 11, a plug of the present invention is shown. The plug 10 is shown in its bi-directional deformed state in FIG. 2, ready for insertion into a tube or pipe and the plug 10 is shown in its pre-deformed state or restored state in FIG. 3. The plug is made from a material that utilizes allotropic states, commonly known as shape-memory alloys. The plug 10 is used to repair a leaking tube 20 in a heat exchanger 36, for example. After a leaking tube in a heat exchanger 36 is identified, the exchanger 36 is disassembled to the point where access can be gained to the entrance field 40 of the leaking heat exchange tube 20. A plug 10 according to the present invention is selected such that the bent diameter D' of annular wings 12/14 at room temperature is slightly less than the inner diameter ID of the heat exchange tube 20 and the unbent diameter D of the annular wings 13/15 is slightly greater than the inner diameter ID of the heat exchanger tube 20. The plug 10 is made of a shape-memory alloy, preferably a compound of Nickel/Titanium intermetalic compound, commonly known as a Nitinol alloy. Nitinol exhibits the phenomena of thermal shape memory as well as superelasticity. The plug 10 is manufactured by machining or molding the Nitinol alloy into the base shape of the plug 10. In its base shape, the plug walls 13/15 are substantially perpendicular to the plug shaft 16 along its axis 17 as in FIG. 3. During manufacture, the plug 10 is cooled to the martensite finish temperature of the alloy using any method known in the industry to achieve the temperature required such as using liquid nitrogen. The martensite finish temperature depends upon the exact alloy composition. In an embodiment of the present invention, the martensite finish temperature is −140° F. Once the plug 10 is at its martensite finish temperature, the plug 10 can be deformed by up to 8% strain, indicated by b. The plug wings 13/15 are precisely bent using a mold or tool so the diameter D' of its wings 12/14 is slightly smaller than the inner diameter ID of the intended tube 20. The wings are bent in opposite directions so that when they restore, the force of one wing 12/13 pushes against the other wing 14/15. In a two wing plug 10, one wing 12 is bent toward one end of the plug shaft 16 and the other wing 14 is bent toward the distal end of the plug shaft 16. By forming and bending the plug 10 in a controlled manufacturing environment, greater precision is obtained of that of bending a plug at the site of installation. In some embodiments, the plug 10 wings 12/13/14/15 have a radius r at their outer edge at a point at which the wings 12/13/14/15 interface with the tube 20 during the restore phase so that the wings 12/13/14/15 are allowed to almost completely restore and an increased surface area of the wings 12/13/14/15 is in contact with the inner surface 22 of the tube 20.

After inserting the plug 10 into the failed tube 20, the plug is heated to the austenite finish temperature of the alloy which will return it to its first, unbent, allotropic state. In one embodiment of the present invention, the austenite finish temperature is 150° F. This will result in the diameter of the wings 12/14 going back to approximately their original diameter D thereby sealing the pipe. By design, the wings 12/14 cannot achieve their original diameter because the tube's 20 inner diameter ID is slightly smaller than the plug's 10 original diameter D, thereby exerting a continuous force on the walls of the tube 20. The plug is heated by any known way, including a heat gun.

The alloy composition is created so that the austenite finish temperature is higher than temperatures to which the plug 10 will be exposed during storage and shipping, preferable between 140° F. and 160° F. Once the plug restores to its original diameter, the heat exchanger assembly can be assembled and immediately put back into service.

The wings 12/14 of the deformed plug 10 are bent away from each other, creating a plug in which the forces of the restored shape push against each other, creating a tighter fit within the tube 20 and capable of withstanding higher pressures.

An installed plug can be removed from a tube by drilling or the preferred method of utilizing an electro burnout rod. The heat exchanger assembly must be disassembled so that access can be gained to the tube sheet and the tubes having the plugs. A burnout electro rod is placed into the center drilled shaft of the plug instantly burning through the shaft diameter thereby collapsing the annular wings.

Figure 4:
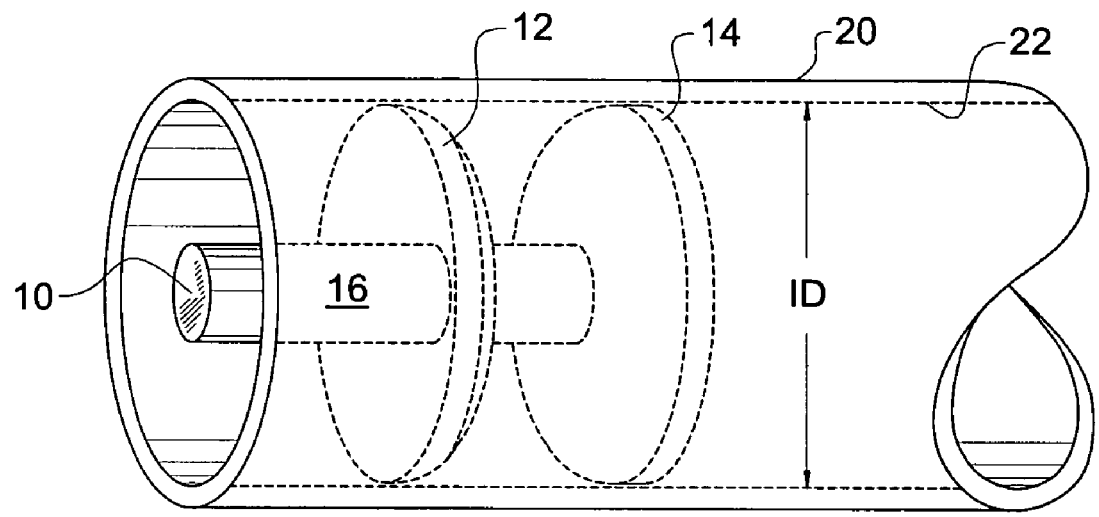
FIG. 4 illustrates a side view of a tube with a plug of the first embodiment of the present invention inserted, the plug in its deformed state.
Figure 5:
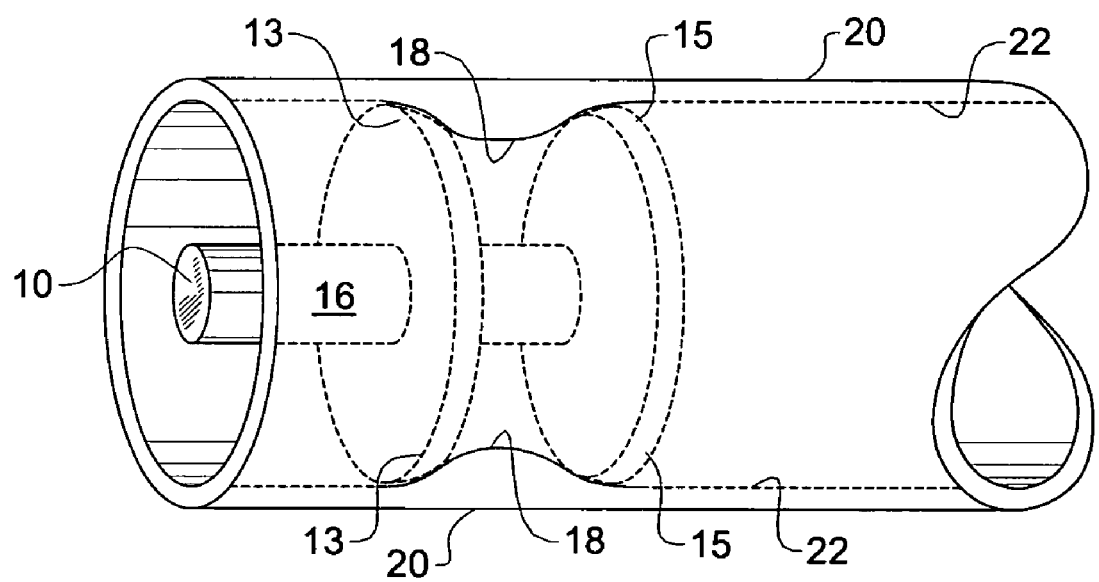
FIG. 5 illustrates a side view of a tube with a plug of the first embodiment of the present invention inserted, the plug in its restored state.

Referring now to FIG. 4 and FIG. 5, the operation of the plug will be described. In FIG. 4, the deformed plug 10 with shaft 16 and wings 12/14 has an outer diameter D' that is slightly less than the inner diameter ID of the tube 20, measured between the tube's 20 inner walls 22. The deformed plug 10 is inserted into the tube 20. In FIG. 5, the plug 10 has been heated above the austenite finish temperature and has almost completely restored to its original shape due to the shape-memory properties of the shape-memory alloy used to make the plug. Since the original diameter D of the plug 10 is greater than the inner diameter ID of the tube 20, the plug wings 13/15 apply force against the inner walls 22 of the tube 20. The wings 12/14 were bent in opposite directions, as show in FIG. 2 and FIG. 4 and plug wings 13/15 are almost completely restored to their original shape. When the austenite finish temperature is reached, the plug wings 13/15 try to restore to their original shape, but are restrained by the inner wall 22 of the tube 20. This restraint creates a pressure seal between the plug wings 13/15 and the inner wall 22 of the tube 20. Furthermore, due to the high pressure created by the plug wings 13/15 pushing towards each other during recovery phase, a microscopic bump 18 is formed in the inner wall 22. This microscopic bump 18 further enhances the performance of the plug 10, preventing leakage and preventing the plug from blowing out of the tube 20 when subject to high pressure. For example, a plug 10 has a diameter D of 0.702 inches and the tube has an inner diameter ID of 0.694 inches. The wings 12/14 are bent to 5–8% of its mass recovery so that D' is approximately 0.682 inches. When the wings 12/14 try to recover within the tube, the tube prevents them from recovering to their original diameter D of 0.702 inches, being restricted by the inner diameter of the tube ID of 0.694 inches. Therefore, the plug 10 is only allowed to recover to approximately 95% of the bend and a continual pressure is exerted as the wings 12/14 continue to try and restore to their original diameter D.

Figure 6:
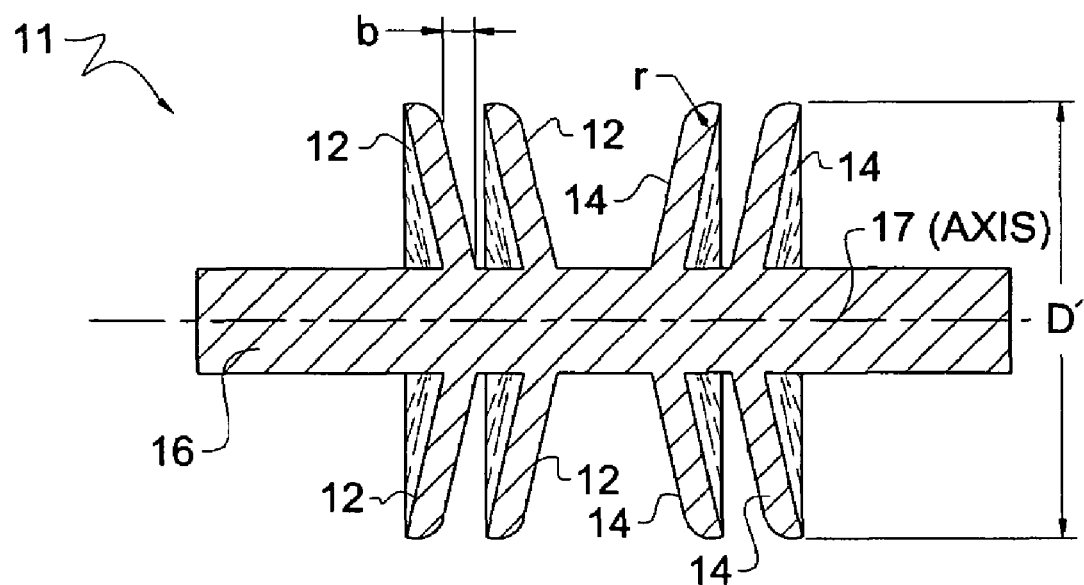
FIG. 6 illustrates a side sectional view of a plug of a second embodiment of the present invention in its deformed state.
Figure 7:
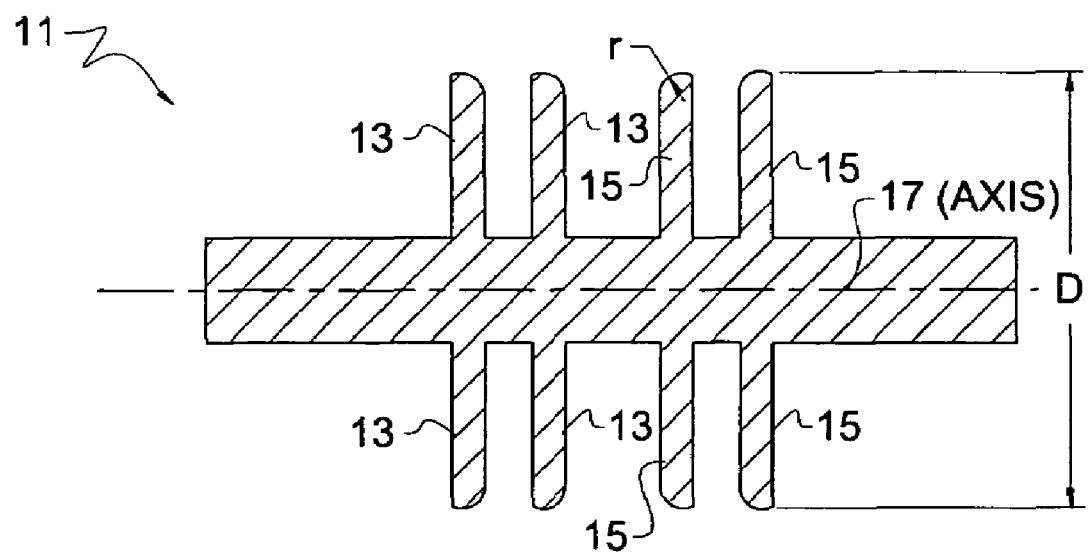
FIG. 7 illustrates a side sectional view of a plug of the second embodiment of the present invention in its restored state.
Figure 6A:
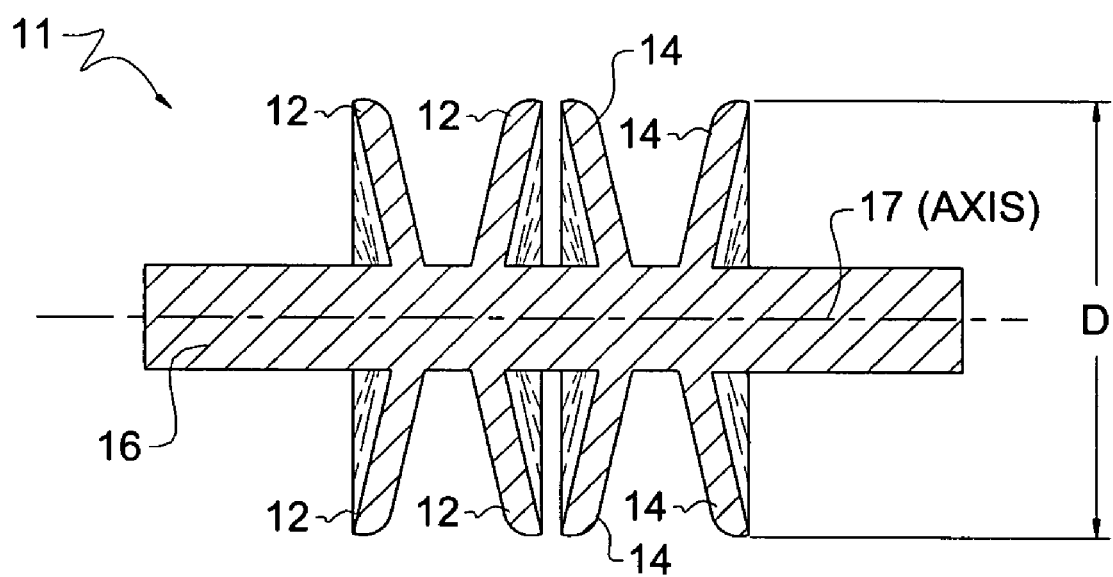
FIG. 6a illustrates a side sectional view of a plug of a third embodiment of the present invention in its deformed state.

Referring to FIG. 6, FIG. 6a and FIG. 7, a plug of a second embodiment of the present invention is shown. The plug 11 is shown in its deformed state in FIG. 6, ready for insertion into a tube and the plug 11 is shown in its pre-deformed state or restored state in FIG. 7. The plug 11 in FIG. 6a is shown in its deformed state. In this embodiment, the pairs of wings are bent in opposite directions, instead of bending each pair in the same direction as in FIG. 6. The plug 11 is made of the same materials as the plug 10 of FIG. 2 and FIG. 3, but has four plug wings 12/13/14/15 instead of two plug wings of plug 10. In its base shape, the plug walls 13/15 are substantially perpendicular to the plug shaft 16 along its axis 17 as in FIG. 7. During manufacture, the plug 11 is cooled to the martensite finish temperature of the alloy using any method known in the industry to achieve the temperature required. The martensite finish temperature depends upon the exact alloy composition, usually −150° Fahrenheit. Once the plug 11 is at its martensite finish temperature, the plug 11 can be deformed by up to 8% strain represented by b. The plug walls 13/15 are precisely bent using a mold or tool so the diameter D' of its wings 12/14 is slightly smaller than the inner diameter ID of the intended tube 20 (see FIG. 4). In FIG. 6, the wings 12/14 are bent in opposite directions so that when they restore, the force of one pair of wings 12/13 pushes against the other pair of wings 14/15. In a four wing plug 11 of FIG. 6, two wings 12 are bent toward one end of the plug shaft 16 and the other two wings 14 are bent toward the distal end of the plug shaft 16. In another embodiment, one wing 12 and one wing 14 are bent toward a first end of the plug shaft 16 and the other wing 12 and the other wing 14 are bent toward a distal end of the plug shaft as shown in FIG. 6a. After inserting the plug 11 into the failed tube, the plug is heated to the austenite finish temperature of the alloy which will return it to its first, unbent, allotropic state. This will result in the diameter of the wings 12/14 going back to approximately their original diameter D thereby sealing the pipe. By design, the wings 12/14 cannot achieve their original diameter because the tube's 20 inner diameter D is slightly smaller than the plug's 11 original diameter D, thereby exerting a continuous force on the walls of the tube 20. The plug is heated by any known way, including a heat gun.

The alloy composition is created so that the austenite finish temperature is higher than temperatures to which the plug 11 will be exposed during storage and shipping, preferable between 140° F. and 160° F. Once the plug restores to its original diameter, the heat exchanger assembly can be assembled and immediately put back into use.

The wings 12/14 of the deformed plug 10 are bent away from each other, creating a plug in which the forces of the restored shape push against each other, creating a tighter fit within the tube 20 and capable of withstanding higher pressures. In this example, four plug wings 12/13/14/15 are deployed but in other examples, any number of plug wings 12/13/14/15 is deployed. In some embodiments having more than two plug wings 12/13/14/15, sets of plug wings 12/13/14/15 are sized to have a slightly different diameter to compensate for tube 20 inner diameter ID tolerances and plug 10/11 manufacturing tolerances.

Referring now to FIG. 8 and FIG. 9, a plug of the first embodiment of the present invention is shown in its deformed state being inserted into a tube. The plug 10 has wings 12/14 and a shaft 16. The top wings 12 are bent in an upward direction and the bottom wings 14 are bent in a downward direction, so that when there austenite finish temperature is reached, the wings 12/14 apply a force towards each other. The plug 10 has a diameter that is slightly smaller than the inner diameter ID of the tube 20 so it can be inserted within the inner wall 22 of the tube 20. Once inserted, the plug 10 is heated until it reaches its austenite finish temperature and the wings 12/14 try to restore to their original shape, applying pressure to the inner wall 22 of the tube 20. FIG. 9 shows how the plug 10 looks as it is inserted into the tube 20. It can be seen that there is a gap between the outer surface of the plug wing 12 and the inner surface of the tube wall 22. This gap gets closed when the plug 10 is heated to its austenite finish temperature and restores substantially to its original shape. The shaft 16 is also visible.

Although, in prior embodiments, the shaft is substantially rounded, in other embodiments the shaft is oval, triangular or rectangular. The wing 12 is visible and there is a slight clearance between the outer diameter of the wing 12 and the inner diameter of the tube 22.

Figure 10:
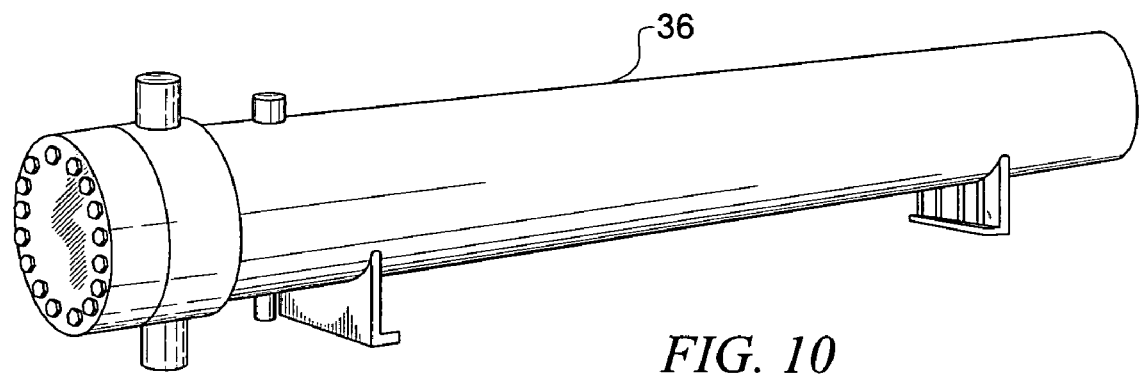
FIG. 10 and FIG. 11 illustrate perspective views of a heat exchanger showing tubes that can be plugged by the present invention.
Figure 11:
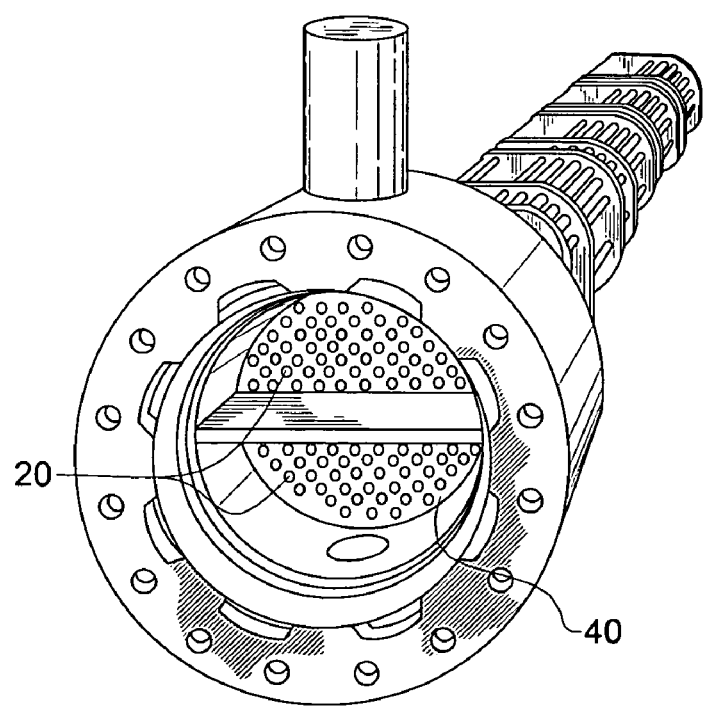

Referring now to FIG. 10 and FIG. 11, a heat exchanger 36 is shown. The plugs of the present invention can be configured in such a way as to expand the overall diameter of the heat exchange tube when the restore to their original shape. If a plug is placed close to where the heat exchange tube 20 is attached to the tube sheet 40, sealing between the heat exchange tube 20 and the tube sheet 40 will be improved.

In all embodiments, the wings 12/13/14/15 are formed and bent so there is a clearance on the order of thousandths of an inch between the outer diameter of wings 12/13/14/15 and the inner diameter of heat exchange tube 20, thus ensuring a strong seal.

The plug 10/11 is manufactured by melting ingots of the desired composition (e.g., Nickel/Titanium) and introducing the molten composition into a mold. When Nickel/Titanium is used, various methods of melting are known, including Vacuum Induction Melting and Vacuum Arc Re-melting, as well as Electron Beam melting, Plasma melting, Cold Skull melting and Reactive Powder methods. The molded plug is then further shaped by hot working, typically at a temperature of 600° to 800° C., creating a plug with a diameter D slightly greater than the inner diameter ID of the target application. The final step includes cooling the plug to its martensite finish temperature and bending the wings 13/15 of the plug using a form or tool so that their bent diameter D' is less than the inner diameter ID of the target application. In some embodiments, the plug must be annealed or heat treated to bring the alloy to its desired size and characteristics.

Referring now to FIG. 12, a tool and die for manufacturing the present invention is shown. The tool has two sections 60/61 in which the die 62/64 is inserted. Two pins 70 hold the plug 11 in the tool.

Referring now to FIG. 13, a close-up view of the die for manufacturing the present invention is shown. The die has two sections 62/64, each one configured to pull the plug 11 in opposite directions. The die sections 62/64 have lips 63 that pull the wings of the plug 11 when the die sections 63/64 are pulled in opposite directions. Two pins 70 and an arm 65 hold the plug 11 in the tool.

Figure 14:
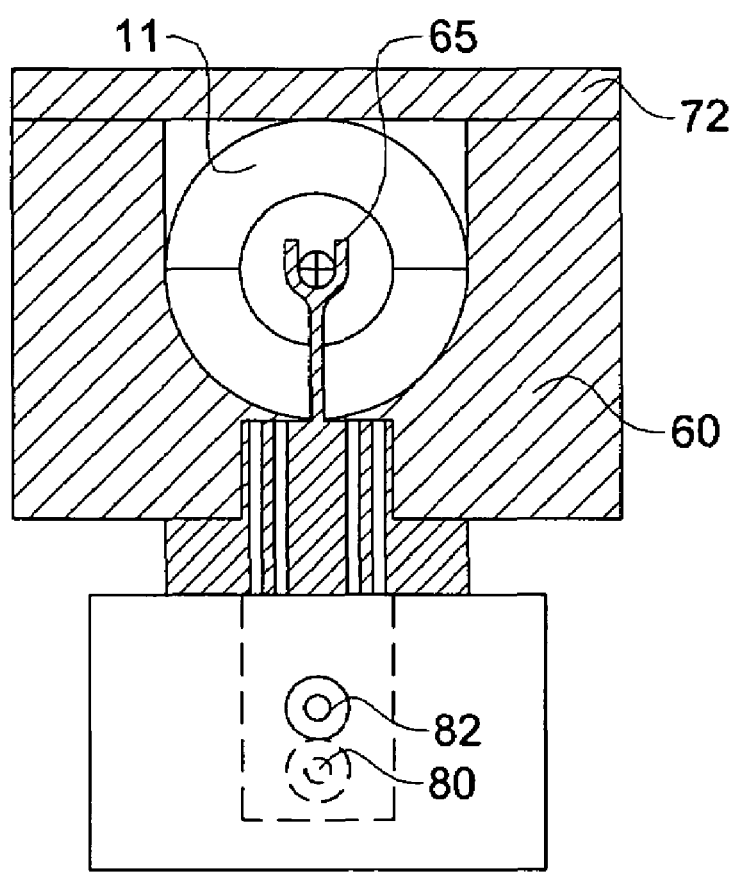
FIG. 14 illustrates a side end sectional view of the tool and die for manufacturing the present invention.

Referring now to FIG. 14, a side end sectional view of the tool and die for manufacturing the present invention is shown. In this view, the plug 11 rests on the arm 65 and the tool end 60 is visible. A cover 72 holds the die sections 62/64 within the tool. Coolant inlet ports 80/82 are also visible.

Figure 15:
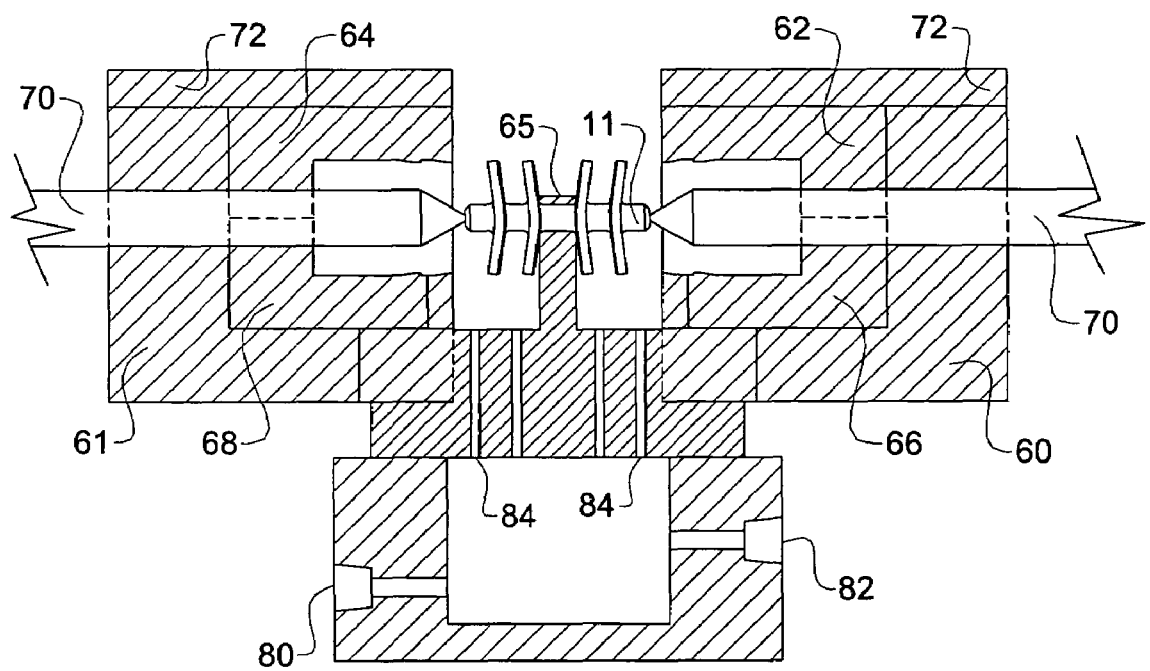
FIG. 15 illustrates a side sectional view of the tool and die for manufacturing the present invention.

Referring now to FIG. 15, a side sectional view of the tool and die for manufacturing the present invention is shown. In this view, the tow halves of the tool 60/61 have already been pulled apart, deforming the plug 11. The plug is held in place by an arm 65 and two pins 70. The die is sized to match the plug 11 size and has four sections, two upper sections 62/64 and two lower sections 66/68. A cover 72 holds the die upper sections 62/64 against the die lower sections 66/68 while the tool sections 60/61 are pulled in opposite directions. In order to cool the plug 11 to the martensite finish temperature, a coolant such as liquid nitrogen is introduced into coolant ports 80/82 and the coolant flows up and around the plug 11 through coolant tubes 84.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device for sealing a tube, the tube having an inner diameter, the device comprising:
   a plug having at least two annular plug wings, the plug made of a shape-memory alloy; and
   the at least two annular plug wings formed substantially perpendicular to an axis of the plug and having an unbent diameter greater than the inner diameter of the tube, the at least two annular plug wings are bent in opposite directions when in a martensite phase, the at least two annular plug wings having a bent diameter less than the inner diameter of the tube wherein the plug substantially restores to an unbent state when heated above an austenite finish temperature of the alloy.

2. The device for sealing a tube of claim 1, wherein the shape-memory alloy is a nickel/titanium alloy.

3. The device for sealing a tube of claim 1, wherein the austenite finish temperature of the alloy is greater than or equal to 140 degrees Fahrenheit.

4. The device for sealing a tube of claim 3, wherein the plug creates a microscopic bump in the tube when it restores within the tube.

5. The device for sealing a tube of claim 4, wherein the martensite finish temperature of the alloy is less than −140 degrees Fahrenheit.

6. The device for sealing a tube of claim 2, wherein the at least two annular plug wings are bent approximately 8 percent.

7. A method for sealing a tube, the tube having an inner diameter, the method comprising:
   selecting a plug having at least two annular plug wings, the plug made of a shape-memory alloy, the at least two annular plug wings formed substantially perpendicular to an axis of the plug, the at least two annular plug wings having an unbent diameter greater than the inner diameter of the tube, the at least two annular plug wings are bent in opposite directions when in a martensite phase, the at least two annular plug wings having a bent diameter less than the inner diameter of the tube;
   inserting the plug into an open end of the tube with the plug wings bent in opposite directions; and
   heating the plug to a temperature corresponding to the plug's austenite finish temperature, wherein the plug substantially restores to the unbent diameter.

8. The method for sealing a tube of claim 7, wherein the austenite finish temperature is greater than or equal to 140 degrees Fahrenheit.

9. The method for sealing a tube of claim 8, wherein the heating includes using a heat gun to heat the plug and the tube.

10. An apparatus for plugging a tube, the tube having an inner diameter, the apparatus comprising:
    a plug means having at least two annular plug wings, the plug means made of a shape-memory alloy; and
    the at least two annular plug wings formed substantially perpendicular to an axis of the plug means and having an unbent diameter greater than the inner diameter of the tube, the at least two annular plug wings are bent in opposite directions when in a martensite phase, the at least two annular plug wings having a bent diameter less than the inner diameter of the tube wherein the plug substantially restores to an unbent state when heated above an austenite finish temperature of the shape-memory alloy.

11. The apparatus for sealing a tube of claim 10, wherein the shape-memory alloy is a nickel/titanium alloy.

12. The apparatus for sealing a tube of claim 10, wherein the austenite finish temperature of the shape-memory alloy is greater than or equal to 140 degrees Fahrenheit.

13. The apparatus for sealing a tube of claim 12, wherein the plug creates a microscopic bump in the tube when it restores within the tube.

14. The apparatus for sealing a tube of claim 12, wherein the martensite finish temperature of the alloy is less than −140 degrees Fahrenheit.

15. The apparatus for sealing a tube of claim 10, wherein the at least two annular plug wings are bent approximately 8 percent.

* * * * *